July 2, 1940.     J. P. BURKE     2,206,740
NUT AND METHOD OF FORMING SAME
Filed Dec. 8, 1938
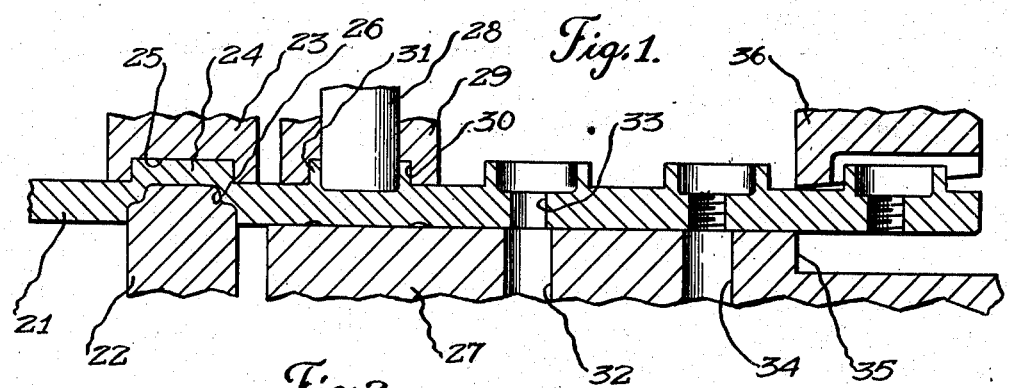
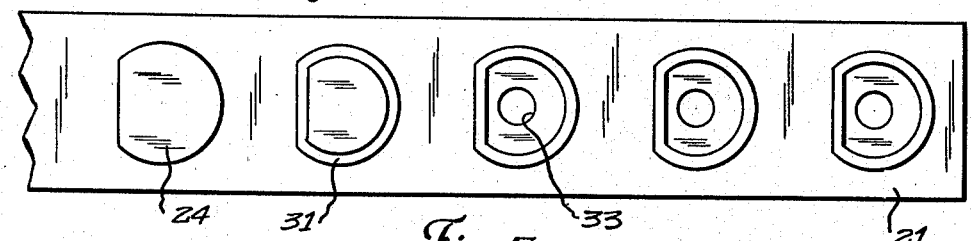
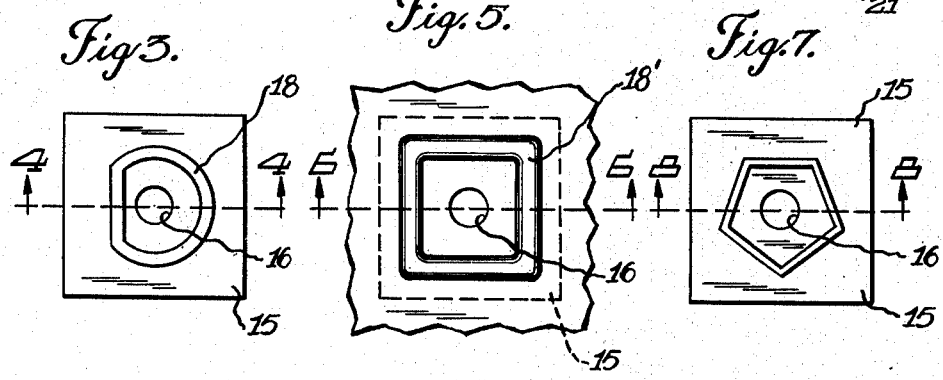
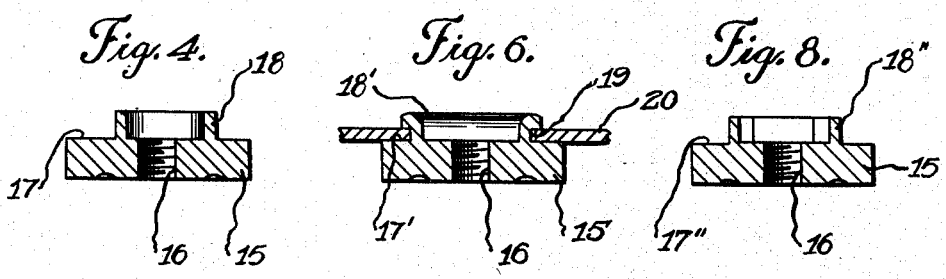
INVENTOR.
JAMES P. BURKE.
BY
ATTORNEY.

Patented July 2, 1940

2,206,740

UNITED STATES PATENT OFFICE 2,206,740

NUT AND METHOD OF FORMING SAME

James P. Burke, Detroit, Mich., assignor to Bert L. Quarnstrom and F. L. McLaughlin, both of Detroit, Mich.

Application December 8, 1938, Serial No. 244,652

3 Claims. (Cl. 10—86)

My invention relates to a new and useful improvement in a nut and method of forming the same, and has for its object the provision of a nut of the clinch type and a method of forming the same whereby the nut may be economically and quickly manufactured, and whereby a nut possessed of maximum efficiency and durability may be provided.

Another object of the invention is the provision of a nut having a threaded opening formed therethrough and provided with a projection extending outwardly from one face adjacent the opening and formed integral with the body thereof.

Another object of the invention is the provision of a method of forming a nut by pressing outwardly from one face of a blank from which the nut is to be formed a projection, and then forcing a portion of said projection into its original position, leaving the remainder to provide a clamp which may be provided through an opening formed in a supporting body and flattened thereof to clamp the nut in position.

Other objects will appear hereinafter.

The invention consists in the combination and arrangement of parts hereinafter described and claimed.

The invention will be best understood by a reference to the accompanying drawing which forms a part of this specification, and in which, Fig. 1 is a longitudinal, central, vertical, sectional view of a blank from which the nut is to be made, illustrating the various steps of formation.

Fig. 2 is a top plan view of the blank, illustrating the various steps of formation.

Fig. 3 is a top plan view of a nut, fabricated according to the invention.

Fig. 4 is a sectional view taken on line 4—4 of Fig. 3.

Fig. 5 is a plan view of another form of nut, showing it in clinched position.

Fig. 6 is a sectional view taken on line 6—6 of Fig. 5.

Fig. 7 is a plan view of another form of nut.

Fig. 8 is a sectional view taken on line 8—8 of Fig. 7.

In Figs. 3, 5, and 7, I have illustrated nuts of different formations which may be constructed by the method herein set out.

In Fig. 3, I have illustrated a nut body 15 having a threaded opening 16 formed therein, and projecting outwardly from the face 17 of the nut body is a projection 18 surrounding the opening 16 and formed D-shaped.

In Fig. 5, I have shown the nut body 15 having the threaded opening 16 formed therein, surrounded by a rectangular projection 18' extending outwardly from the face 17'. In this view, the nut is illustrated with the projection extended through an opening 19 formed in the panel or supporting body 20 upon which it is desired to attach the nut. This projection 18', after being projected through the opening 19, is clinched, or upset, so as to clamp the nut on the panel 20.

In Fig. 7, I have illustrated the nut body with the opening 16 formed therein, and having a pentagonal projection 18'' extending outwardly from the face 17'' and surrounding the opening 16.

From the description, it will appear obvious that any form of projection, even embracing a single wall-like structure, may be formed on the face of the nut.

In Fig. 1, I have illustrated the formation of the nut, and for this purpose I used a strip 21 of metal which is set by any suitable means into the forming mechanism. In the first operation, a punch 22 cooperating with a die 23 is brought into contact with one face of the strip 21 so as to form the boss 24 on one face of the strip 21 by forcing a portion of the material of the strip 21 into the cavity 25 of the die 23. This, of course, forms a recess or cavity 26 on the opposite face of the strip 21, this face being termed the lower face, so that the body 24 appears on the upper face of the strip. The strip then passes on to a table 27 and the next operation is performed by the punch and die 28 and 29, respectively, the die having a cavity 30 formed therein, which cooperates with the punch 28 in forming the projection 31. The strip is pressed against the table 27 and the die 29 embraces, by its cavity 30, the boss 24. While so embraced, the punch then presses the boss against the body forcing the material engaged, thereby, back to its original shape so that the material in the cavity 30 engaged by the punch 28 remains projecting outwardly. It is obvious that by providing this cavity 30 of different sizes and shapes, the size and shape on the projection 31, which is left standing after the punch 28 has operated, may be determined. The strip then passes into alignment with an opening 32 formed in the table at which point a punch is used to form the opening 33. The strip then moves to the opening 34 at which point the opening 33 is threaded. The strip passes then to the cut-away portion 35 of the table at which point the cut-off tool 36 serves to cut off the portion of the strip which forms a nut. In the operation illustrated in Fig. 1 and Fig. 2, the punch and die 28 and 29, respectively, are arranged to provide a D-shaped projection such as shown in Fig. 3.

It is apparent that the operation is a successive one, and that the outwardly extending projection, which is used for clinching purposes in order to secure the nut to the supporting body or panel, is formed during the operations. Thus, it becomes possible to use a flat strip of metal without any point formed projection thereon. This operation also permits the formation of the nut from hot rolled stock, which is an advantage in manufacturing over those processes which require cold rolled stock.

In Fig. 1, I have shown a final stage of forming the boss 24 and the projection 18. It is believed obvious that the boss 24 may be formed in a number of successive steps by pressing it slightly upwardly at each succeeding step until the final form shown in Fig. 1 is arrived at, thus relieving the forming tools of excessive strain. It is also believed obvious that pressing the boss back to its original position to provide the projection 18 may be accomplished in a number of successive steps until the final step, as illustrated in Fig. 1, is arrived at.

While I have illustrated and described the preferred form of construction, I do not wish to limit myself to the precise details of structure shown, but wish to avail myself of such variations and modifications as may come within the scope of the appended claims.

What I claim as new is:

1. The method of forming a nut having a projection on one face thereof consisting in applying pressure to one face for forcing a boss outwardly from the opposite face, surrounding said boss by a die, and applying pressure to a portion of said boss while surrounded by said die for forcing said portion of said boss to substantially its original position while retaining the remainder of said boss projecting adjacent the inner face of the die in the position to which originally pressed.

2. The method of forming a nut, having an opening, from a blank consisting in applying pressure to one face of said blank for forcing an outwardly projecting boss on the opposite face, forcing a portion of said boss backwardly to substantially its original position while retaining the remainder of said boss projecting outwardly in the position into which originally pressed, and forming an opening through said blank within the area defined by said projecting portion of said boss.

3. The method of forming a nut from a strip of blank material consisting in subjecting a portion of said strip to pressure on one face for forcing an outwardly projecting boss on the opposite face, subjecting a portion of said boss to reverse pressure for restoring said portion to original position while retaining the remainder of said boss in its originally outwardly pressed position, forming an opening through said strip in the area defined by said outwardly projecting portion and severing the opening-bearing part from the remainder of the strip.

JAMES P. BURKE.